United States Patent
Hahn et al.

(10) Patent No.: US 6,397,614 B1
(45) Date of Patent: Jun. 4, 2002

(54) MODIFIED EXPANSION DEVICE FOR REFRIGERANT CYCLE LOW CHARGE OPERATION

(75) Inventors: Greg Hahn; Zili Sun; Carlos Zamudio, all of Arkadelphia; Jason Hugenroth, Hope; Thomas Barito, Arkadelphia, all of AR (US); James W. Bush, Skaneateles, NY (US); Joe T. Hill; John R. Williams, both of Bristol, VA (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/790,274

(22) Filed: Feb. 22, 2001

(51) Int. Cl.[7] ................................................. F25B 41/04
(52) U.S. Cl. ........................................ 62/222; 62/196.1
(58) Field of Search ................................ 62/196.1, 197, 62/200, 222

(56) References Cited

U.S. PATENT DOCUMENTS

| | | | | |
|---|---|---|---|---|
| 3,243,970 A | * | 4/1966 | Lippincott | 62/197 |
| 4,362,027 A | * | 12/1982 | Barbier | 62/197 |
| 5,862,676 A | * | 1/1999 | Kim et al. | 62/197 |
| 6,233,956 B1 | * | 5/2001 | Katayama et al. | 62/197 |

* cited by examiner

Primary Examiner—Denise L. Esquivel
Assistant Examiner—Malik N. Drake
(74) Attorney, Agent, or Firm—Carlson, Gaskey & Olds

(57) ABSTRACT

A refrigerant cycle is provided with an expansion device that is movable between a normal mode of operation and a low charge mode of operation. In the low charge mode of operation, the expansion device does not lower the pressure of the refrigerant as much as it does in its normal mode of operation. In this way, the relatively high pressure ratios that are experienced by a compressor during a low charge operation will not be experienced. Instead, the pressure ratio across the compressor is reduced during low charge operation, and the compressor will be better protected.

12 Claims, 1 Drawing Sheet

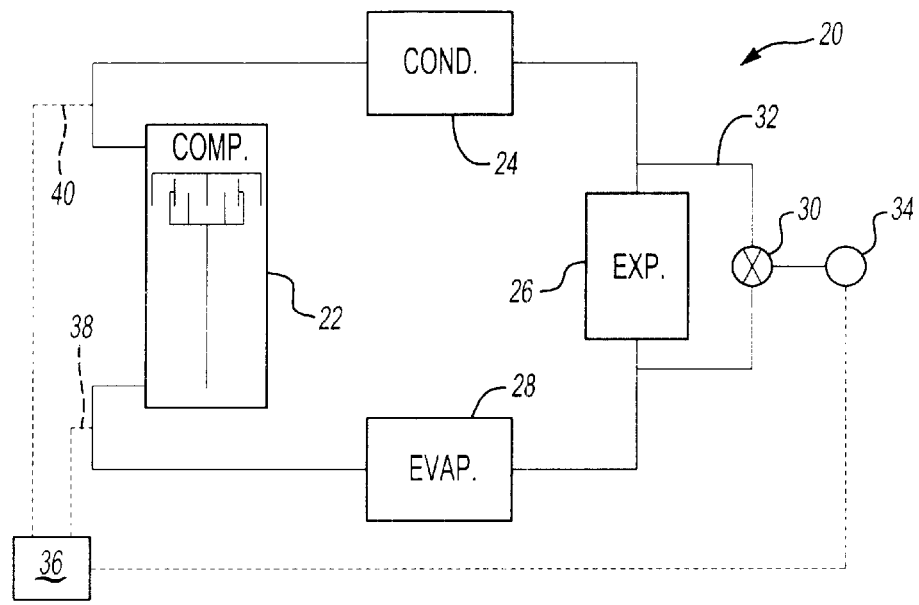
*Fig-1*
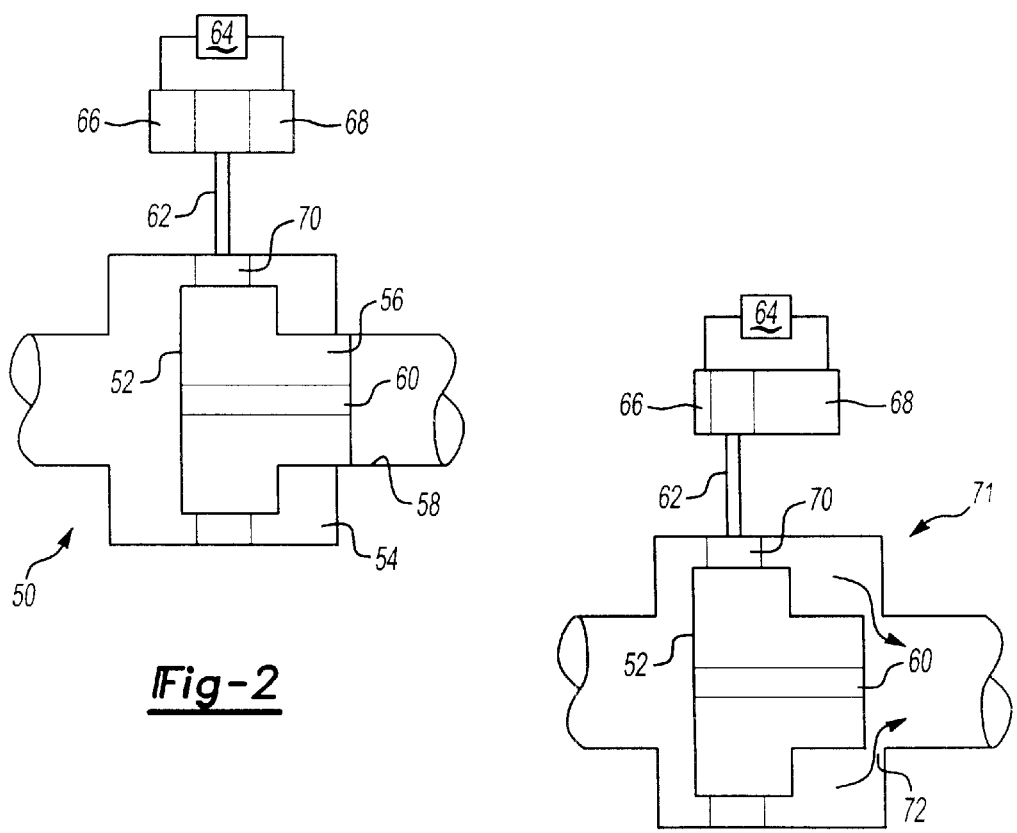
*Fig-2*
*Fig-3*

US 6,397,614 B1

MODIFIED EXPANSION DEVICE FOR REFRIGERANT CYCLE LOW CHARGE OPERATION

BACKGROUND OF THE INVENTION

This invention relates to an expansion device and a refrigerant cycle wherein the expansion device does not lower the pressure of a refrigerant at low charge condition as much as it does under normal operation.

Refrigerant cycles are utilized for cooling purposes. As an example, refrigerant cycles are incorporated into air conditioning and refrigeration systems. In a refrigerant cycle a refrigerant passes from a compressor to a condenser. The refrigerant is compressed in the compressor, and gives off heat to the environment in the condenser. From the condenser, the refrigerant passes to an expansion device. At the expansion device, the pressure of the refrigerant is significantly reduced. Typically, the refrigerant is passed through an orifice to expand and reduce its pressure. From the expansion device, the refrigerant passes to an evaporator. In the evaporator, the refrigerant cools an environment to be cooled by the refrigerant system. The refrigerant returns to the compressor from the evaporator. This is a somewhat simplified explanation, and many other components are often incorporated into the refrigerant cycle. However, this basic description does accurately reflect the operation of refrigerant cycle.

Typically, the connections and various components in the refrigerant cycle are sealed such that the refrigerant does not leak. However, in practice, refrigerant does sometimes leak outwardly of the system. When leaks occur, the charge of refrigerant is decreased from that which is desirable. When there is a lower charge refrigerant than is desirable, operation of the compressor becomes somewhat complicated. Low refrigerant charge may result in abnormally low suction port pressures. When this low pressure vapor is compressed to the relatively high discharge pressure, the resulting high pressure ratio compression process causes high discharge temperatures in the compressor. This is undesirable.

In one particularly popular modern compressor, two scroll members orbit relative to each other to compress refrigerant. The high pressure ratios as described above under low charge operation are particularly undesirable in a scroll compressor.

SUMMARY OF THE INVENTION

In a disclosed embodiment of this invention, a compressor in a refrigerant cycle is protected during low charge operation by modifying the expansion device such that it does not lower the pressure as much when low charge operation is sensed. The expansion device will normally lower the pressure to a first relatively low pressure. However, if the system senses that there is a low charge, then the expansion device does not lower the pressure to the first low pressure. That is, the expansion device operates in both a normal and a low charge mode.

In one embodiment, the expansion device is provided with a bypass line. The bypass line can be inserted internally into the expansion valve body, or can be an external connection. However, for purposes of this application, a bypass line which bypasses from a downstream location relative to the condenser to an upstream location relative to the evaporator will be considered as part of the expansion valve. In normal condition, the bypass line is closed. However, if a loss of charge situation is identified due to conditions within the refrigerant cycle, the bypass is open. In this way, the refrigerant is not brought to the lower pressure in the expansion device. Thus, the refrigerant delivered to the suction side of the compressor will be at a higher pressure than it would have been in the prior art. The pressure ratio across the compressor will thus not be as high in a low charge situation as is the case in the prior art.

In the second embodiment, the expansion device includes a piston which is driven between normal and low charge positions. In the normal position, the valve provides a restriction to flow that will result in the reduced pressure. However, in the loss of charge condition, the piston will present less of a restriction to flow, and the pressure will thus not be as lower, providing a similar effect as in the prior embodiment.

The identification of a low charge situation is specifically disclosed by monitoring the inlet and discharge pressure to the compressor. However, other methods of identifying a low charge situation can be utilized. A worker in this art would recognize several ways of identifying such a condition.

These and other features of the present invention can be best understood from the following specification and drawings, the following of which is a brief description.

BRIEF DESCRIPTION OF THE DRAWINGS

FIG. 1 is a schematic view of an inventive refrigerant cycle.

FIG. 2 shows a second embodiment device in the first normal position.

FIG. 3 shows the expansion device of FIG. 2 when there is a low charge operation.

DETAILED DESCRIPTION OF A PREFERRED EMBODIMENT

A refrigerant cycle 20 is illustrated in FIG. 1 incorporating a compressor 22 supplying a compressed refrigerant to a condenser 24. From the condenser 24 the refrigerant passes to an expansion device 26. From the expansion device 26, the refrigerant is lowered in pressure and sent to an evaporator 28. The refrigerant passes from the evaporator back to the compressor 22. This is a somewhat simplified diagram of a refrigerant cycle, and other components and subsystems may be incorporated. However, for purposes of understanding this application, this diagram will suffice.

As shown, a bypass valve 30 is positioned at a bypass line 32 and is controlled by a control 34 to be selectively closed. In the closed position, the refrigerant cycle 20 operates as normal. However, a sensor 36, which may be a control for the overall refrigerant cycle 20, receives inputs such as the suction pressure 38 and discharge pressure 40 from the compressor 22. These input are used to determine whether the cycle 20 is undergoing a loss of charge situation. As an example, if the pressure ratio between signal 38 and 40 is undesirably high, a determination can be made that there is likely a loss of charge situation ongoing in the cycle 20. Under such conditions, the controls 34 and 36 open the valve 32 to allow bypass through the line 32. In this way, the expansion device 26 will not serve to lower the pressure of the refrigerant passing to the evaporator 28. Again, for purposes of this application, the bypass line 32 and valve 30 are considered to be part of the expansion device 26.

FIG. 2 shows a second embodiment 50 wherein a piston 52 provides the expansion device and is movable within an enlarged chamber 54. A smaller forward portion 56 of the piston 52 is movable within a narrowed chamber 58. An orifice 60 extends through the piston 52. The piston 52 is driven by a drive piston device 62 which is controlled by controller 64. Controller 64 receives signals such as from sensor 36, and may deliver a fluid to one of the two chambers 66 and 68 to drive the piston 52 to a forward normal position as shown in FIG. 2, or to a retracted low charge position 71 such as shown in FIG. 3. As shown, a plurality of fins 70 on the outer periphery of the piston 52 are circumferentially spaced and will allow flow between the inlet of the expansion device and the outlet, and through a path other than orifice 60. However, in the normal position shown in FIG. 2, the smaller portion 56 seals within the portion 58 and this outer flow does not pass through the expansion device. When the piston 52 is driven to its retracted position such as shown in FIG. 3, a substantial portion of fluid can flow through the new passage 72 in addition to the orifice 60. Thus, the expansion of the refrigerant that would occur in the FIG. 2 position, will not occur, or at least will not occur to as great an extent in the FIG. 3 position. Thus, the fluid pressure will not be lowered to the same extent, and the protection described above will be provided by this embodiment. While a fluid driven arrangement 66 and 68 is illustrated, other ways of moving the piston would be within the scope of this invention.

Although a preferred embodiment of this invention has been disclosed, a worker in this art would recognize that certain modifications would come within the scope of this invention. For that reason, the following claims should be studied to determine the true scope and content of this invention.

What is claimed is:

1. A refrigerant cycle comprising:

a compressor;

a condenser;

an expansion device;

an evaporator; and said expansion device being movable between a normal mode and a low charge mode, and said expansion device being operable to reduce the pressure of a refrigerant to a first relatively low pressure in said normal mode, and to reduce the pressure of the refrigerant to a pressure above said first low pressure when in said low charge mode, and a control making a determination that said system and said expansion device should be moved to said low charge mode when system conditions indicate that the refrigerant cycle has a lower than desirable charge of refrigerant.

2. A cycle as recited in claim 1, wherein a selectively open bypass line selectively bypasses said expansion device, and a control opens said selectively open bypass valve when a determination is made that a low charge mode should be entered.

3. A cycle as recited in claim 1, wherein a control monitors the suction and discharge pressure of the compressor to determine that the system should enter a low charge mode.

4. A cycle as recited in claim 1, wherein said compressor is a scroll compressor.

5. A refrigerant cycle comprising:

a compressor;

a condenser;

an expansion device;

an evaporator;

said expansion device being movable between a normal mode and a low charge mode, and said expansion device being operable to reduce the pressure of a refrigerant to a first relatively low pressure in said normal mode, and to reduce the pressure of the refrigerant to a pressure above said first low pressure when in said low charge mode; and said expansion device is a selectively movable piston which is movable between a normal position at which it provides a first level of restriction to flow, and movable to a low charge position at which it provides a lesser amount of restriction to flow.

6. A cycle as recited in claim 5, wherein a control drives a drive assembly for driving said piston between said normal and low charge positions.

7. A cycle as recited in claim 6, wherein said drive system includes a fluid driven piston for driving said movable piston between said normal and reduced restriction position.

8. A refrigerant cycle comprising:

a scroll compressor;

a condenser;

an expansion device;

an evaporator; and said expansion device being movable between a normal mode and a low charge mode, and said expansion device being operable to reduce the pressure of a refrigerant to a first relatively low pressure in said normal mode, and to reduce the pressure of the refrigerant to a pressure above said first low pressure when in said low charge mode, said expansion device including a bypass line selectively opened by a valve, said valve receiving signals indicative of a low charge mode in said system, and said valve then opening to allow the bypass of refrigerant around said expansion device, a control making a determination to move said system and said expansion device into a low charge mode when sensed system conditions indicate that said system has a lower than desirable charge of refrigerant.

9. A cycle as recited in claim 8, wherein a control monitors the suction and discharge pressure of the compressor to determine that the system is in a low charge mode.

10. A method of operating a refrigerant cycle comprising the steps of:

(1) providing a compressor, a condenser, an expansion device and an evaporator, and providing a refrigerant within a cycle including these four elements;

(2) monitoring system conditions and determining whether a system should be in a normal mode or in a low charge mode dependent on sensed conditions indicative of said refrigerant cycle having a lower than normal charge of refrigerant, and moving said expansion valve between a normal mode of operation and a low charge mode of operation dependent upon said determination made by said control, refrigerant within said cycle, said expansion device reducing a refrigerant to a first lower pressure when in said normal mode, and not reducing the pressure of said refrigerant as low as said first low pressure when said expansion device is in said low charge mode.

11. A method of operating a refrigerant cycle as recited in claim 10, wherein said expansion device includes a bypass line with a bypass valve, and said bypass valve remaining closed in said normal mode but being opened in said low charge mode.

12. A method as recited in claim 10, wherein said expansion valve is movable between a first position at which it provides a first higher level of restriction to flow and to a second position at which it presents a lower level of restriction to flow, and said expansion valve being driven to said second position when in said low charge mode.

* * * * *